United States Patent
Xu et al.

(10) Patent No.: US 10,572,407 B2
(45) Date of Patent: Feb. 25, 2020

(54) HYBRID DATA STORAGE ARRAY

(71) Applicant: Western Digital Technologies, Inc., San Jose, CA (US)

(72) Inventors: Jun Xu, Singapore (SG); Junpeng Niu, Singapore (SG); William Bernard Boyle, Lake Forest, CA (US); Jie Yu, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 15/675,018

(22) Filed: Aug. 11, 2017

(65) Prior Publication Data
US 2019/0050353 A1     Feb. 14, 2019

(51) Int. Cl.
*G06F 3/06*     (2006.01)
*G06F 13/16*    (2006.01)

(52) U.S. Cl.
CPC ......... *G06F 13/1694* (2013.01); *G06F 3/061* (2013.01); *G06F 3/0631* (2013.01); *G06F 3/0658* (2013.01); *G06F 3/0659* (2013.01); *G06F 3/0685* (2013.01); *G06F 3/0688* (2013.01); *G06F 2003/0697* (2013.01); *G06F 2212/217* (2013.01)

(58) Field of Classification Search
CPC ........ G06F 13/16; G06F 13/1694; G06F 3/06; G06F 3/061; G06F 3/0631; G06F 3/0658; G06F 3/0689; G06F 3/065; G06F 3/0644; G06F 3/0659; G06F 3/0614; G06F 3/0649; G06F 3/0607; G06F 3/067; G06F 12/00; G06F 3/0619; G06F 3/0632; G06F 3/0685; G06F 3/0688; G06F 3/0613; G06F 3/0655; G06F 3/0646; G06F 11/1448; G06F 2003/0697; G06F 2212/217
USPC ........................................................ 711/154
See application file for complete search history.

(56) References Cited

U.S. PATENT DOCUMENTS 8,555,022 B1    10/2013  Edwards et al.
9,639,457 B1 *   5/2017  Piszczek ................. G06F 13/16
(Continued)

OTHER PUBLICATIONS

X. Wu and A. L. N. Reddy, A Novel Approach to Manage a Hybrid storage System, Journal of communications,V7 (7), 2012, USA.
(Continued)

*Primary Examiner* — Shawn X Gu
*Assistant Examiner* — Jean C Edouard
(74) *Attorney, Agent, or Firm* — Chang & Hale LLP (57) ABSTRACT

A data storage system may include one or more storage arrays. Each storage array may include a first set of solid-state drives and a first set of striped hard disk drives. Each solid-state drive of the first set of solid-state drives has a first data throughput and the set of stripe hard disk drives has a second data throughput. The second data throughput of the first set of striped hard disk drives is within a threshold throughput of the first data throughput. The data storage system also includes a processing device configured to receive an access request to write first data to the storage array and determine a read access frequency of the first data. The processing device may also be configured to determine a write access frequency of the first data and write the first data to the first set of solid-state drives or the first set of striped hard disk drives, based on the read access frequency and the write access frequency.

17 Claims, 6 Drawing Sheets

(56) References Cited

U.S. PATENT DOCUMENTS

| | | | |
|---|---|---|---|
| 2010/0079885 A1* | 4/2010 | McKean | G06F 11/1662 360/15 |
| 2011/0179219 A1* | 7/2011 | Ma | G06F 3/0613 711/103 |
| 2011/0320690 A1* | 12/2011 | Petersen | G06F 3/0611 711/103 |
| 2012/0059978 A1* | 3/2012 | Rosenband | G06F 3/0613 711/103 |
| 2012/0198152 A1 | 8/2012 | Terry et al. | |
| 2012/0290779 A1* | 11/2012 | Eleftheriou | G06F 3/0616 711/103 |
| 2013/0205070 A1* | 8/2013 | Koseki | G06F 3/0616 711/103 |
| 2013/0238832 A1* | 9/2013 | Dronamraju | G06F 3/0608 711/103 |
| 2016/0077747 A1* | 3/2016 | Snaman, Jr. | G06F 3/0613 707/641 |
| 2016/0246519 A1* | 8/2016 | McKean | G06F 3/0611 |

OTHER PUBLICATIONS

G. Soundararajan, V. Prabhakaran, M. Balakrishnan and T. Wobber Extending SSD lifetimes with disk-based write caches. Proc. of USENIX FAST, 2010, Canada.

Co-pending Western Digital U.S. Appl. No. 15/136,833, filed Apr. 22, 2016.

International Search Report and Written Opinion dated Sep. 27, 2018 for PCT/US2018/038623.

* cited by examiner

| HDD1 | HDD2 | HDD3 | SSD1 | SSD2 | SSD3 |
|------|------|------|------|------|------|
| P1 | P1 | P1 | P1 | P2 | P3 |
| P2 | P2 | P3 | P1 | P2 | P3 |
| P3 | P2 | P2 | P1 | P2 | P3 |
| P2 | P2 | P2 | P1 | P2 | P3 |
| P3 | P3 | P3 | P1 | P2 | P3 |

HYBRID DATA STORAGE ARRAY

BACKGROUND

Field

The present disclosure relates to data storage systems. In particular, the present disclosure relates to data storage systems that include hard disk drives (HDDs) and solid state drives (SSDs).

Description of Related Art

Users may store data, such as files in various types of data storage systems/architectures. For example, data centers, cloud storage platforms/systems, cloud computing platforms/systems, may use data storage systems/architectures to allow users to store/access data. The data storage systems may include different types of hard disk drives, such as hard disk drives and solid-state drives. The data hard disk drives and solid-state drives may be arranged into arrays and/or sub-arrays (e.g., groups of disk drives). Generally, the solid-state disks and the hard disk drives are used in separate storage pools, storage arrays, or storage sub-arrays (e.g., one sub-array/pool may include only solid-state drives or only hard disk drives).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Data Storage Systems

As discussed above, storage architectures/systems (which may be used in data centers, cloud storage platforms/systems, cloud computing platforms/systems, etc.) may use both solid-state disks and hard disk drives. Generally, the solid-state disks and the hard disk drives are used in separate storage pools, storage arrays, or storage sub-arrays (e.g., one sub-array/pool may include only solid-state drives or only hard disk drives). Thus, the arrays, sub-arrays, pools, etc., that include only solid-state drives may be used as a cache for data accesses and/or may be used to provide higher performance for customers (e.g., for customers that pay a higher price for the higher performance). Although solid-state drives may provide higher/faster performance (than hard disk drives), solid-state drives have write cycle limitations. Thus, writing data to the solid-state drives may increase the wear and/or decrease the life (e.g., the decrease the time to failure, decrease the operational life, etc.) of the solid state drives. Although hard disk drives may not have such write cycle limitations, hard disk drives may provide slower/lower performance (than solid-state drives).

Certain embodiments described herein provide the ability to combine both solid-state drives and hard disk drives in a storage array/sub-array of data storage systems. The hard disk drives in the storage array/sub-array may be configured (e.g., striped) to match or come within a threshold of the performance of the solid-state drives in the storage array/sub-array. Data that is stored/written to a storage array/sub-array may be stored on the solid-state drives (in the storage array/sub-array) or the hard disk drives (in the storage array/sub-array) based on the read access frequency and the write access frequency of the data. This may allow the storage array/sub-array to handle random and sequential data with performance that is comparable to a storage array/sub-array that includes only solid-state drives. This may also reduce the costs of the data storage system because hard disk drives may be cheaper than solid-state drives. This may further increase the life (e.g., the decrease the time to failure, decrease the operational life, etc.) of the solid state drives because frequently written data may be stored in the hard disk drives (which do not have write cycle limitations). In addition, transferring data between the solid-state drives and the hard disk drives in the same storage array/sub-array may be faster because the solid-state drives and the hard disk drives may share an internal bus/interface which may allow for faster data transfer.

Figure 1:
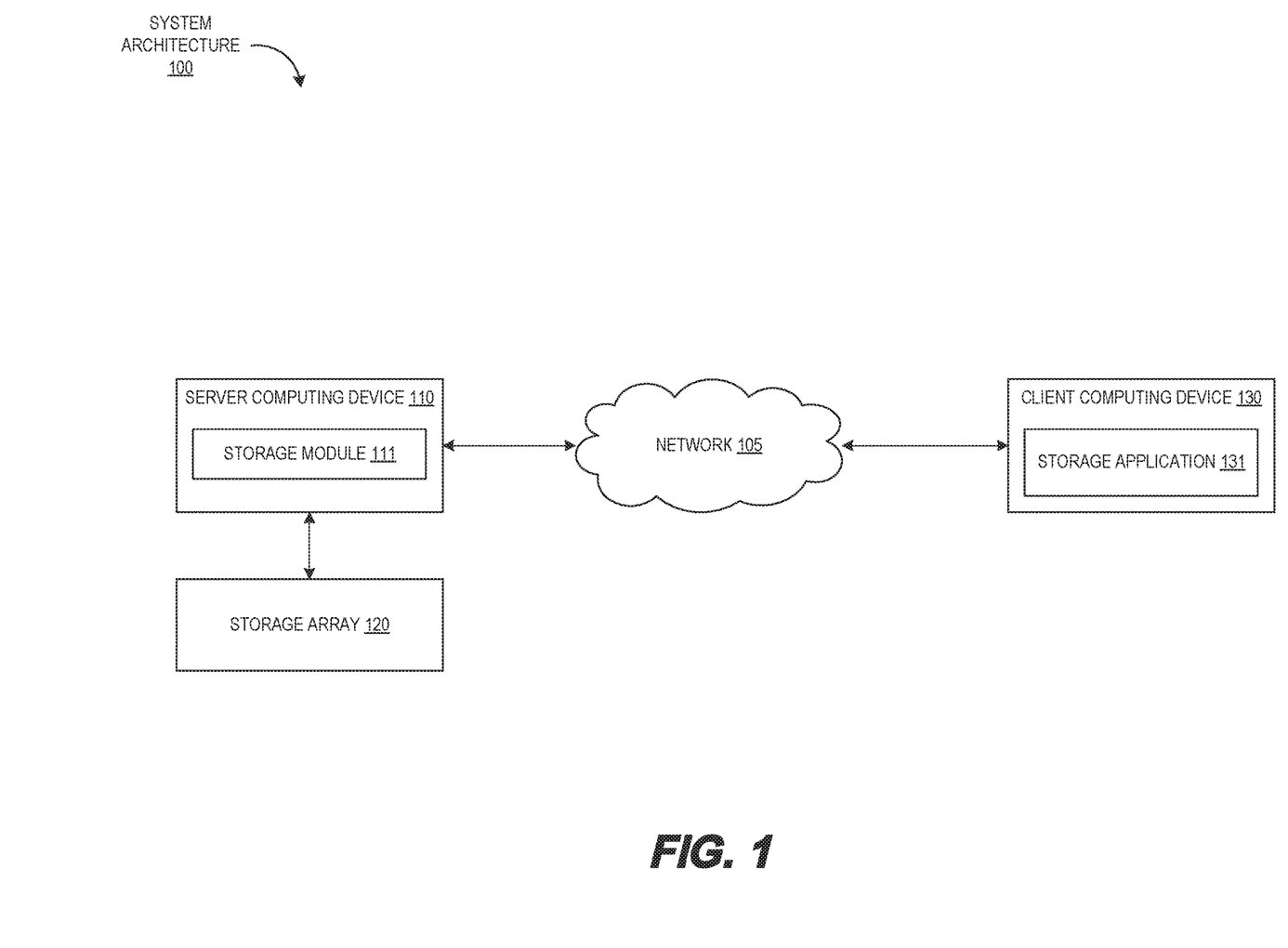
FIG. 1 is a diagram of an example system architecture, in accordance with one or more embodiments.

FIG. 1 is a diagram of an example system architecture 100, in accordance with one or more embodiments. The system architecture includes a network 105, a server computing device 110, a storage array 120, and a client computing device 130. The server computing device 110 may be communicatively coupled to the client computing device 130 via the network 105. The server computing device is coupled to the storage array 120. The system architecture 100 may provide various computing devices (e.g., client devices, smartphones, cable set-top boxes, smart TV's, video game consoles, laptop computers, tablet computers, desktop computers, etc.) with access to various types of data (e.g., files) stored on the storage array 120. For example, the system architecture 100 may provide file-based data storage services to the client computing device 130. The system architecture 100 may also allow users to store various types of user data on the storage array 120. The server computing device 110 includes a storage module 111. The client computing device 130 includes a storage application 131.

The network 105 may include one or more of an ad hoc network, a peer to peer communication link, an intranet, an extranet, a virtual private network (VPN), a public network (e.g., the Internet), a private network (e.g., a local area network (LAN)), or wide area network (WAN) such as the Internet, a wired network (e.g., Ethernet network), a wireless network (e.g., an 802.11 network, a Wi-Fi network, a wireless LAN (WLAN), a wireless WAN (WWAN), etc.), a cellular network (e.g., a Long Term Evolution (LTE) network), a metropolitan area network (MAN), a portion of the Internet, a portion of the Public Switched Telephone Network (PSTN), routers, hubs, switches, server computers, other types of computer network, and/or a combination thereof. In some embodiments, the storage array 120 may also be coupled to the network 105

The storage array 220 may store data and/or data objects that may be accessed by the client computing device 130. The storage array 220 may include multiple data storage devices (e.g., multiple storage drives such as hard disk drives (HDDs), solid state drives (SSDs), etc.). A data storage device may comprise magnetic media (e.g., magnetic discs, shingled magnetic recording (SMR) media/discs, etc.) and/or solid-state media. While certain description herein may refer to solid state memory or flash memory generally, it is understood that solid state memory and/or flash memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. In some embodiments, the storage array 120 may be coupled to the network 105. In other embodiments, the storage array 120 may include in and/or part of the server computing device 110. For example, the storage array 120 may be in the same rack, housing, chassis, etc., as the server computing device 110.

The storage array 120 may include a one or more of sub-arrays, as discussed in more detail below. Each of the sub-arrays may include a set of solid-state drives (e.g., one or more solid-state drives) and a set of hard disk drives (e.g., one or more hard disk drives). In one embodiment, the set of solid-state drives may include a plurality of homogenous drives. For example, each of the solid-state drives in the set of solid-state drives (for a sub-array) may have the same capacity (e.g., storage capacity, storage space, etc.), the same model number/manufacturer, the same type of flash memory (e.g., single-level cell (SLC), multi-level cell (MLC), tri-level cell (TLC), etc.), the same performance/throughput, etc. In another embodiment, the set of solid-state drives may include a plurality of heterogeneous drives. For example, each of the solid-state drives in the set of solid-state drives (for a sub-array) may have different capacities, different model numbers/manufacturers, the different types of flash memory, different performances/throughputs, etc. In one embodiment, the set of hard disk drives may include a plurality of homogenous drives. For example, each of the hard disk drives in the set of hard disk drives (for the sub-array) may have the same capacity (e.g., storage capacity, storage space, etc.), the same model number/manufacturer, the same disk layout (e.g., the same sectors per track, the same block size, etc.), and/or the same type of magnetic media (e.g., SMR media/discs, etc.). In another embodiment, the set of hard disk drives may include a plurality of heterogeneous drives. For example, each of the hard disk drives in the set of hard disk drives (for the sub-array) may have the different capacities, different model numbers/manufacturers, different disk layouts, and/or the different types of magnetic media.

In one embodiment, the set of solid-state drives may have a one or more data throughputs. The data throughputs for the set of solid-state drives may include one or more of the sequential read throughput (e.g., the amount of data that be read sequentially in a period of time), sequential write throughput (e.g., the amount of data that can be written sequentially in a period of time), the random read throughput (e.g., the amount of data that be read randomly in a period of time), and random write throughput (e.g., the amount of data that can be written randomly in a period of time). The solid-state drives in the set may have the same data throughputs (when homogenous drives are used) or may have different data throughputs (when heterogeneous drives are used). In another embodiment, the set of hard disk drives may also have one or more data throughputs. The data throughputs for the set of hard disk drives may also include one or more of the sequential read throughput, sequential write throughput, the random read throughput, and random write throughput. The hard disk drives in the set may have the same data throughput (when homogenous drives are used) or may have different data throughputs (when heterogeneous drives are used).

In one embodiment, the storage module 111 determine the number of hard disk drives that should be used in a sub-array based on the data throughput (or data throughputs) of the solid states drives that are in the sub-array, as discussed in more detail below. For example, the storage module 111 may determine the number of hard disk drives that should be configured in a redundant array of independent disks (RAID) level/configuration (e.g., RAID 0, RAID 5, etc.), such that the hard disk drives (e.g., striped hard disk drives) match and/or are within a threshold of the performance (e.g., read throughput, write throughput, etc.) of one or more of the solid-state drives in the sub-array. For example, if a solid-state drive have a write throughput of 350 megabytes per second (MBps) and a hard disk drive has a write throughput of 180 MPps, then two hard disk drives may be configured in RAID 0 to match the performance of the solid-state drive. In another example, if a solid-state drive has a write throughput of 380 MBps and a hard disk drive has a write throughput of 180 MPps, then five hard disk drives may be configured in RAID 0 to match the performance of the two solid-state drives. The threshold of the performance of the solid-state drives in the sub-array may be used when an exact performance match (e.g., an exact throughput match) is not obtainable based on the performances of the solid-state drives and the hard disk drives that are used. One having ordinary skill in the art understands that any number of hard disk drives (in the sub-array) may be configured in a striped configuration (such as RAID 0, RAID 1, RAID, 5, RAID 6, etc.) in order to match or come within a threshold of the performance of one or more solid-state drives (in the sub-array). The hard disk drives in a sub-array may be referred to as striped hard disk drives.

In one embodiment, the arrays, sub-arrays, and/or drives in the arrays/sub-arrays (e.g., HDDs, SSDs), may be configured in various ways with different RAID levels and coding schemes/formats. For example, RAID may be implement within a sub-array or across multiple sub-arrays. In addition, coding schemes/formats such as erasure codes, parity codes, etc., may be implemented within a sub-array or across multiple sub-arrays. The coding schemes/formats (e.g., erasure codes) may allow for data/error recovery of data that is stored in the storage array 120.

As illustrated in FIG. 1, client computing device 130 includes storage application 131. The storage application 131 may be an application (e.g., software, an app, etc.) that allows a user to access data (e.g., files) stored in the system architecture 100 (e.g., store in the storage array 120). The storage application 131 may communicate with the storage module 111 and/or server computing device 110 using a representation state transfer (REST) based interface. For example, the storage module 111 and/or server computing device 110 may provide application programming interfaces (APIs) that may be used by the storage application 131 to communicate (e.g., transmit and/or receive data such as messages, files, etc.) with the storage module 111 and/or server computing device 110. In one embodiment, the storage application 131 (and/or client computing device 130) may transmit data access requests to the storage module 111 (and/or server computing device 110) via the network 105. The data access requests may be messages, commands, and/or requests to access the storage array 120. For example, a data access request may indicate that the storage application 131 wants to read data from the storage array 120. In another example, a data access request may indicate that the storage application 131 wants to write data to the storage array 120.

In one embodiment, the storage module 111 (and/or server computing device 110) may receive the data access requests from the storage application 131 (and/or client computing device 130). For example, the storage module 111 may receive a data access request (from the storage application 131) to write data (e.g., a file, one or more blocks/pages, etc.) to the storage array 120.

In one embodiment, the storage module 111 may determine a read access frequency of the data and/or may determine a write access frequency of the data. A read access frequency may indicate how often data (e.g., a file, blocks/pages, etc.) may be read (e.g., accessed) by users and/or may indicate a prediction of how often the data may be read by users. For example, the read access frequency for a file may indicate how often users read the file and/or may indicate a prediction of how often users will read the file. A write access frequency may indicate how often data (e.g., a file, blocks/pages, etc.) may be written to (e.g., accessed) by users and/or may indicate a prediction of how often the data may be written to by users. For example, the write access frequency for a file may indicate how often users write to the file and/or may indicate a prediction of how often users will write to the file. In some embodiments, the storage module 111 may receive the access frequency. For example, the storage module 111 may read the access frequency for the data from a configuration file. In another example, a user may provide (user input indicating) the access frequency for the data.

One having ordinary skill in the art understands that various techniques, methods, functions, operations, algorithms, may be used to determine the read access frequency and/or write access frequency for data. One having ordinary skill in the art also understands that various representations and/or ranges may be used to represent the read access frequency and/or write access frequency for data. For example, a numerical representation (ranging from 0 to 1, ranging from 1 to 5, etc.) may be used such that the higher the number, the higher the access frequency (or vice versa). Data that has a read access frequency greater than a threshold read access frequency may be referred to as read hot data. Data that has a write access frequency greater than a threshold write access frequency may be referred to as write hot data.

In one embodiment, the storage module 111 (and/or server computing device 110) may write the data (received from the storage application 131 and/or client computing device 130) to the hard disk drives of the sub-array or the solid-state drives of the sub-array, based on the read access frequency and/or the write access frequency (as discussed in more detail below). For example, the storage module 111 may determine whether the read access frequency exceeds a threshold read access frequency (e.g., may determine whether the read access frequency is greater than 0 if the read access frequency ranges from 0 to 1). In another example, the storage module 111 may determine whether the write access frequency exceeds a threshold write access frequency (e.g., may determine whether the write access frequency is greater than 0 if the write access frequency ranges from 0 to 1).

In one embodiment, the storage module 111 may write data to one or more of the solid-state drives (in the sub-array) when the read access frequency exceeds the threshold read access frequency that the write access frequency does not exceed the threshold write access frequency, as discussed in more detail below. For example, the storage module 111 may write data to one or more of the solid-state drives (in the sub-array) if the read access frequency for the data is 1 (when the read access frequency ranges from 0 to 1) and if the write access frequency is 0 (when the write access frequency ranges from 0 to 1).

In one embodiment, the storage module 111 may write data to one or more hard disk drives (in the sub-array) when the read access frequency does not exceed the threshold read access frequency and the write access frequency exceeds the threshold write access frequency. For example, the storage module 111 may write data to one or more hard disk drives (in the sub-array) if the read access frequency for the data is 0 (when the read access frequency ranges from 0 to 1) and if the write access frequency is 1 (when the write access frequency ranges from 0 to 1).

In one embodiment, the storage module 111 may write data to one or more hard disk drives (in the sub-array) when the read access frequency does not exceed the threshold read access frequency and the write access frequency does not exceed the threshold write access frequency. For example, the storage module 111 may write data to one or more hard disk drives (in the sub-array) if the read access frequency for the data is 0 (when the read access frequency ranges from 0 to 1) and if the write access frequency is 0 (when the write access frequency ranges from 0 to 1).

In one embodiment, the storage module 111 may determine performance metrics for the hard disk drives (in the sub-array) and the solid-state drives (in the sub-array) when the read access frequency exceeds the threshold read access frequency and the write access frequency exceeds the threshold write access frequency, as discussed in more detail below. For example, the storage module 111 may determine a first performance metric for the solid-state drives and a second performance metric for the hard disk drives if the read access frequency exceeds the threshold read access frequency and the write access frequency exceeds the threshold write access frequency.

In one embodiment, a performance metric may indicate the current or estimated performance of the hard disk drives and/or solid-state drives. For example, a higher performance metric (e.g., a higher value) may indicate that a drive may have lower performance (e.g., that there is more load, less storage space, higher response times, etc.), and vice versa. In some embodiments, the performance metric may be determined, calculated, generated, etc., based on one or more of the throughputs (e.g., sequential and/or random throughputs) of the hard disks and the solid-state disks, the response times of the hard disks and the solid-state disks (e.g., how long it takes for data to be read from or written to the disks), the remaining capacity/space of the hard disks and the solid-state disks (e.g., the amount of free space), and the current load of the hard disks and the solid-state disks (e.g., the current amount of data being written/read). One having ordinary skill in the art understands that various values and/or ranges of performance metrics may be used. For example, the performance metric may be a numerical value that ranges from 1 to 10, where 10 may indicate the better/faster performance and 1 may indicate lower/worse performance.

In one embodiment, the storage module 111 may write the data to the solid-state drives (in the sub-array) or the hard disk drives (in the sub-array) based on the performance metric for solid-state drives and the performance metric for the hard disk drives, as discussed above. For example, the storage module 111 may write the data to the hard disk drives when the first performance metric is less than the second performance metric. In another example, the storage module 111 may write the data to the solid-state drives when the first performance metric is not less than the second performance metric.

In one embodiment, the storage module 111 may determine whether the data that is stored in the storage array 120 is randomly accessed data or sequentially accessed data. For example, the storage module 111 may determine whether the user is likely to access the data as a continuous set of blocks/pages (e.g., a single file). In another example, the storage module 111 may determine whether the user is likely to access the data as random blocks/pages (e.g., different portions of different files). The storage module 111 may store the data to the hard disk drives (in a sub-array) of the solid-state drives (in the sub-array) based on whether the data is randomly access or sequentially accessed, and based on the read/write access frequencies, as discussed in more detail below.

As discussed above, storage architectures/systems (which may be used in data centers, cloud storage platforms/systems, cloud computing platforms/systems, etc.) may use both solid-state disks and hard disk drives. Generally, the solid-state disks and the hard disk drives are used in separate storage pools, storage arrays, or storage sub-arrays (e.g., one sub-array/pool may include only solid-state drives or only hard disk drives). For example, the arrays, sub-arrays, pools, etc., that include only solid-state drives may have higher performance (e.g., throughput, access times, read times, write times, etc.) than arrays, sub-arrays, pools, etc., that include only hard-disk drives. Thus, the arrays, sub-arrays, pools, etc., that include only solid-state drives may be used as a cache for data accesses and/or may be used to provide higher performance for customers (e.g., for customers that pay a higher price for the higher performance). Although solid-state drives may provide higher/faster performance (e.g., higher sequential/random throughput, faster access times, etc.), solid-state drives have write cycle limitations. For example, writing data to the flash memory (e.g., SLC cells, MLC cells, TLC cells, etc.) may cause wear on the flash memory (e.g., on the SLC cells, MLC cells, TLC cells, etc.). Thus, writing data to the solid-state drives may increase the wear and/or decrease the life (e.g., the decrease the time to failure, decrease the operational life, etc.) of the solid state drives. Although hard disk drives may not have such write cycle limitations, hard disk drives may provide slower/lower performance (than solid-state drives). For example, it may be slower to read data from a hard disk drive when compared to a solid-state drive. However, for sequential accesses (e.g., sequential reads and/or writes), a hard disk drive may have performance close to, similar to, and/or competitive with solid state drives. For example, shingled magnetic record (SMR) hard disk drives may have performance (e.g., sequential read throughput, sequential write throughput, etc.) that is close to the performance of solid-state drives. Thus, it may be beneficial to write data that will be sequentially accessed, to the hard disk drives.

In some embodiments, the examples, implementations, embodiments, and/or configurations described herein may allow a storage array/sub-array (with both hard disk drives and solid-state drives) to handle random and sequential data with comparable to a storage array/sub-array that includes only solid-state drives. For example, data that is sequentially accessed may be stored on the striped hard disk drives of a sub-array which may provide performance (e.g., write throughput) that is similar to a solid state drive). In addition, some embodiments may also reduce the costs of the system architecture 100. By using hard disk drives while provide the same or similar/comparable performance with solid state drives, the cost of the system architecture 100 may be lower because hard disk drives may be cheaper than solid-state drives. In addition, some embodiments may increase the life (e.g., the decrease the time to failure, decrease the operational life, etc.) of the solid state drives because frequently written data may be stored in the hard disk drives (which do not have write cycle limitations). For example, because write intensive data (e.g., data that is frequently written to, such as a file that is constantly updated/changed) may be stored in the hard disk drives, this reduces the amount of data written to the solid-state drives which may increase the life of the solid-state drives (due to the write cycle limitations of solid state drives).

One having ordinary skill in the art understands that the operations, methods, actions, processes, etc., described herein may be performed by one or more of the storage module 111 and/or the storage application 131. For example, the storage module 111 may perform some of the operations described herein (e.g., determine performance metrics) while the storage application 131 may perform other operations described herein (e.g., determine access frequencies).

Figure 2:
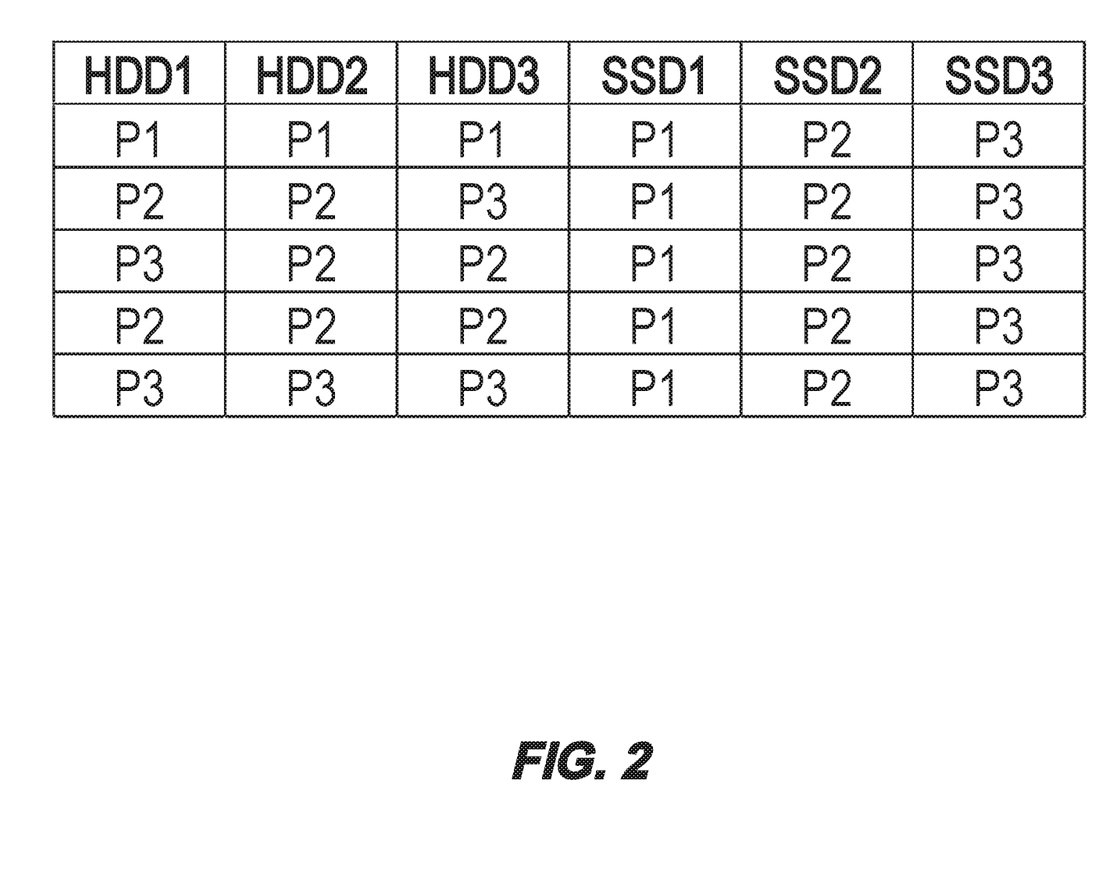
FIG. 2 is an example table illustrating performance levels for hard disk drives and solid-state drives in a sub-array, in accordance with one or more embodiments.

FIG. 2 is an example table 200 illustrating performance levels for hard disk drives and solid-state drives in a sub-array, in accordance with one or more embodiments. As discussed above, a storage array (e.g., storage array 120 illustrated in FIG. 1) may store data and/or data objects that may be accessed by a client computing device (e.g., client computing device 130 illustrated in FIG. 1). The storage array may include multiple data storage devices (e.g., multiple storage drives such as hard disk drives and solid state drives, as discussed above. The hard disk drives may include magnetic storage media (e.g., magnetic rotating disks). The solid state drives may include flash memory (e.g., may be an SSD). One having ordinary skill in the art understands that in other embodiments, a different number and/or different types of storage drives may be included in the storage array. The hard disk drives may be grouped into one or more sub-arrays. In the example illustrated in FIG. 2, each sub-array includes three hard disk drives and three solid-state drives.

In one embodiment, each of the columns of the table 200 may represent a storage device in the sub-array. For example, the first column (going from the left to the right) may represent the first hard drive HDD1 in the sub-array. In another example, the fourth column may represent the first solid state drive SSD1 in the sub-array. In one embodiment, each sub-array may also be divided into stripes, as discussed above. For example, each of the solid-state drives SSD1, SSD2, and SSD3 may be divided into multiple stripes or each of the solid-state drives may form one strip. In another example, different portions of the hard disk drives HDD1, HDD2, and HDD3 may be combined to form different stripes. For example, it may be faster to access data on the outermost diameter (OD) or outer tracks (of the rotating magnetic media) of the hard disk drives when compared to the innermost diameter (ID) or inner tracks (of the rotating magnetic media) of the hard disk drives. The different tracks/diameters of the hard disk drives may be part of different stripes. Each hard disk drive may be divided into multiple stripes or multiple portions of multiple hard disk drives may be combined to form a stripe. As illustrated in Table 200, each of HDD1, HDD2, HDD3, SSD1, SSD2, and SDD3 may be divided into five stripes.

A performance level may be data (e.g., a number, a value, an alphanumeric string, etc.) that may indicate how quickly the data in a chunk may be accessed (e.g., read or written). For example, the higher the performance level, the more quickly the data in the stripe may be accessed (and vice versa). One having ordinary skill in the art understands that various ranges of performance levels may be used. For example, the performance level may be a numerical value that ranges from 1 to 4, where 1 may indicate the fastest access to data for a stripe and 4 may indicate the slowest access to data for a stripe.

As discussed above, the hard disk drives may be heterogeneous drives (e.g., data storage devices with different performances, capacities, etc.) and the-state drives may also be heterogeneous drives. As illustrated in table 200, SSD1, SSD2, and SSD3 have different performance levels P1, P2, and P2, where P1>P2>P3. For example, each stripe in SSD1 may have a performance level P1 (e.g., a read throughput, write throughput, sequential through, and/or random throughput, etc.), each stripe in SSD2 may have a performance level P2, and each stripe in SSD3 may have a performance level P3. Also as illustrated in FIG. 2, HDD1 and HDD3 each have two stripes with performance level P2, one strip with performance level P1, and two strives with performance level P3. HDD2 has one stripe with performance level P1, three stripes with performance level P2 and one stripe with performance level P3. This may be due to the differences in performance between the inner tracks (e.g. innermost tracks) and the outer tracks (e.g., the outermost tracks) of the hard disk drives. In one embodiment, the performances levels of the stripes of HDD1, HDD2, HDD2, SSD1, SSD2, and/or SSD3 may be periodically updated. For example, a storage module may monitor the operation of the hard disk drives and the solid state drives and may update the performance levels if the performances of the stripes change (e.g., if read/write latencies increase/decrease, if free space decrease, if the number of write cycles for flash memory decrease, etc.)

Figure 3:
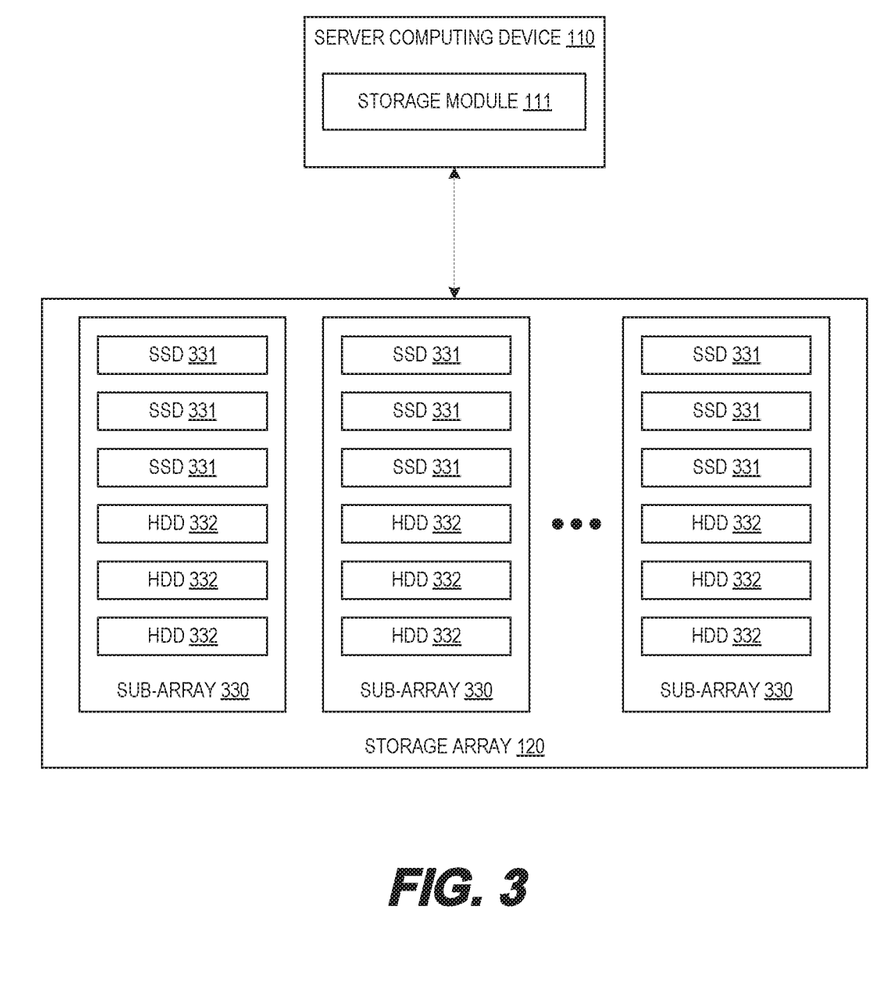
FIG. 3 is a diagram of an example storage array, in accordance with one or more embodiments.

FIG. 3 is a diagram of an example storage array 120, in accordance with one or more embodiments. As discussed above, the storage array 120 may store data and/or data objects that may be accessed by a client computing device (e.g., client computing device 130 illustrated in FIG. 1). The storage array 220 may include multiple data storage devices (e.g., multiple storage drives such as hard disk drives 332 and solid-state drives 331, as discussed above. The hard disk drives 332 may include magnetic storage media (e.g., magnetic rotating disks). The solid state drives may include flash memory (e.g., may be an SSD). One having ordinary skill in the art understands that in other embodiments, a different number and/or different types of storage drives may be included in the storage array 220. The storage array 120 is coupled to a server computing device 110 and the server computing device includes a storage module 111, as discussed above. Although the storage array 120 is illustrated as separate from the server computing device 110, the storage array 120 may be included in and/or part of the server computing device 110.

As illustrated in FIG. 3, the storage array 120 includes multiple sub-arrays 330. Each of the sub-arrays 330 includes three solid-state drives (e.g., a set of solid-state drives) and three hard disk drives (e.g., a set of hard disk drives). The four solid-state drives 331 (in each sub-array 330) may include homogenous drives (e.g., drives with the same storage capacity, performance, etc., as discussed above) or may include heterogeneous drives (e.g., drives with different storage capacities, performances, etc., as discussed above). The three hard disk drives 332 (in each sub-array 330) may include homogenous drives (e.g., drives with the same storage capacity, performance, etc., as discussed above) or may include heterogeneous drives (e.g., drives with different storage capacities, performances, etc., as discussed above).

In one embodiment, each sub-array may further be divided into stripes, as discussed above. For example, each of the solid-state drives 331 may be part of a stripe. In another example, different portions of the hard disk drives 332 may part of different stripes. For example, the outer diameter or outer tracks (of the rotating magnetic media) of the hard disk drives 332 may be part of a first stripe, and the inner diameter or inner tracks (of the rotating magnetic media) of the hard disk drives 332 may be part of a second stripe.

As discussed above, the server computing device 110 and/or storage module 111 (illustrated in FIG. 1) may determine the number of hard disk drives 332 (in a sub-array 330) that should be configured in a striped configuration (e.g., a RAID level/configuration such as RAID 0, RAID 5, etc.), such that the hard disk drives 332 (e.g., striped hard disk drives) match and/or are within a threshold of the performance (e.g., read throughput, write throughput, etc.) of one or more of the solid-state drives 331 in the sub-array 330. In one embodiment, the server computing device 110 and/or a storage module 111 may determine the number of stripes and/or number of hard disk drives by determining a performance level for each of the stripes in the sub-array 330. The following equation (1) may be used to determine the performance level for each of the stripes in the sub-array 330.

$$g_i(t) = \alpha_1 \frac{P_{s,i}}{P_{s,Max}} + \alpha_2 \frac{P_{r,i}}{P_{r,Max}} \qquad (1)$$

Where $P_{s,i}$ and $P_{r,i}$ may be the sequential throughput and random throughput (input/output operations (IOPS)) performance level for the particular stripe i, respectively. $P_{s,Max}$ and $P_{r,Max}$ may be the maximum sequential throughput and maximum random throughput of stripes from all types of disks in the array. $\alpha_1$ and $\alpha_2$ may be weighting coefficients (weights) for the sequential throughputs and random throughputs, respectively. In one embodiment, $\alpha_1$ may be greater than $\alpha_2$ when the ratio of sequential access to random access is higher (e.g., there are more sequential accesses to the storage array 120). In another embodiment, $\alpha_1$ may be less than $\alpha_2$ when the ratio of sequential access to random access is lower (e.g., there are more random accesses to the storage array 120). In a further embodiment, $\alpha_1$ may be equal $\alpha_2$ when the ratio of sequential access to random access is higher (e.g., there are more sequential accesses to the storage array 120). In some embodiments, the read throughput and the write throughput for a solid-state drive may be different and may be considered separately. For example, two instances of equation (1) may be used, one for read throughput and one for write throughput.

As discussed above, the storage module 111 (and/or server computing device 110) receive data to write to or store on the storage array 120 (e.g., may receive data from a client computing device or storage application). The storage module 111 may determine the read access frequency of the data and/or may determine a write access frequency of the data, as discussed above. A read access frequency may indicate how often data (e.g., a file, blocks/pages, etc.) may be read (e.g., accessed) by users and/or may indicate a prediction of how often the data may be read by users, as discussed above. A write access frequency may indicate how often data (e.g., a file, blocks/pages, etc.) may be written to (e.g., accessed) by users and/or may indicate a prediction of how often the data may be written to by users, as discussed above. Data that has a read access frequency greater than a threshold read access frequency may be referred to as read hot data. Data that has a write access frequency greater than a threshold write access frequency may be referred to as write hot data.

As discussed above, the storage module 111 may write data to one or more solid-state drives 331 (e.g., to stripes of the solid-state drives 331) in a sub-array 330 when the data is read hot data and the data is not write hot data (e.g., when the read access frequency exceeds the threshold read access frequency and the write access frequency does not exceed the threshold write access frequency). Also as discussed above, the storage module 111 may write data to one or more hard disk drives 332 (e.g., to stripes of the hard disk drives 332) in the sub-array 330 when the data is not read hot data and the data is write hot data (e.g., when the read access frequency does not exceed the threshold read access frequency and the write access frequency exceeds the threshold write access frequency). Further as discussed above, the storage module 111 may write data to one or more hard disk drives 332 (e.g., to stripes of the hard disk drives 332) in the sub-array 330 when the data is not read hot data and is not write hot data (e.g., when the read access frequency does not exceed the threshold read access frequency and the write access frequency does not exceed the threshold write access frequency).

In one embodiment, the storage module 111 (and/or server computing device 110) may determine performance metrics for the hard disk drives 332 (in the sub-array 330) and the solid-state drives 331 (in the sub-array 330) if the data is read hot data and is write hot data (e.g., when the read access frequency exceeds the threshold read access frequency and the write access frequency exceeds the threshold write access frequency. The performance metric may indicate the performance (e.g., how fast data can be accessed) of a drive. For example, a higher performance metric may indicate a lower performance (e.g., data may take longer to read/write) and vice versa. In one embodiment, the performance metrics for the hard disk drives 332 (or stripes of the hard disk drives 332) may be determined using equations (2) and (4), below. In another embodiment, the performance metrics for the solid-state drives 331 (or stripes of the solid state drives 31) may be determined using equations (3) and (4), as illustrated below.

$$f_{HDD,j}(t) = \beta_{11}(R_j(t) - R_{1f,j}) + \beta_{12}(C_{1f,j} - C_j(t)) + \beta_{13}(I_j(t) - I_{1f,j}) \quad (2)$$

$$f_{SSD,j}(t) = \beta_{21}(R_j(t) - R_{2f,j}) + \beta_{22}(C_{2f,j} - C_j(t)) + \beta_{23}(I_j(t) - I_{2f,j}) \quad (3)$$

$$I_j(t) = \gamma_1 \frac{P_{S,j}(t)}{P_{S,max,j}} + \gamma_2 \frac{P_{R,j}(t)}{P_{R,max,j}} \quad (4)$$

$\beta_{lm}$, l=1; m=1, 2, 3, may be weighting coefficients (e.g., weights) for the parameters of the equations (2) and (3). $R_j(t)$ may be the response time of a drive to external user requests (e.g., the amount of time to response to an access command or request to read data). $R_{lf}$ may be the reference response time related to a QoS (e.g., the response time that may satisfy a QoS). $C_j(t)$ may be the remaining effective capacity of disk (e.g., the remaining free space). $C_{lf,j}(t)$ may be the minimum disk space requirement (e.g., a minimum free space requirement). $I_{lf,j}$ may be the load reference value. $I_j(t)$ may be the current load (combination of sequential and random accesses). $P_{S,j}$ and $P_{R,j}$ may be the average sequential and random performance for the hard disk drives or solid-state drives in a hybrid sub-array j, respectively. $P_{s,Max,j}$ and $P_{r,Max,j}$ are the maximum sequential and random performance of hard disk drives or solid-state drives in the sub array j, respectively. In some embodiments, the weighting coefficients $\beta_{lm}$ may be different for different sub arrays. In other embodiments, the equations (3) and (4) may include other parameters, such as the remaining number of write cycles for a stripe and/or solid state drive.

The storage module 111 may write the data to the solid-state drives 331 (in the sub-array 330) or the hard disk drives 332 (in the sub-array 330) based on the performance metrics for solid-state drives 331 and the performance metrics for the hard disk drives 332 in the sub-array 330 using equation (5), as illustrated below.

$$F_F(t) = f_{SSD,j}(t) - f_{HDD,j}(t) \quad (5)$$

As discussed above, $f_{HDD,j}(t)$ (which is a performance metric for the hard disk drives 332 in a sub-array 330) is determined using equations (2) and (4) and $f_{SDD,j}(t)$ (which is a performance metric for the solid-state drives 331 in the sub-array 330) is determined using equations (3) and (4). Equation (5) may be a time-varying function (e.g., a function that may change over time) related to the performance of drives in a sub-array 330 (e.g., the solid-state drives 331 and the hard disk drives 332), the remaining storage capacity of the drives in the sub-array 330, the performance of the drives in the sub-array 330 (e.g., response times), the quality of service provided by the drives in the sub-array 330, load balance, etc. In one embodiment, the storage module 111 may write data to the solid-state drives 331 (in the sub-array 330) when the result/value of equation (5) is greater than zero. For example, if $f_{SDD,j}(t)$ is greater than $f_{HDD,j}(t)$ the storage module 111 may write data to the solid-state drives 331 (in the sub-array 330). In another embodiment, the storage module 111 may write data to the hard disk drives 332 (in the sub-array 330) when the result/value of equation (5) is less than or equal to zero. For example, if $f_{SDD,j}(t)$ is less than or equal to $f_{HDD,j}(t)$ the storage module 111 may write data to the hard disk drives 332 (in the sub-array 330).

Figure 4:
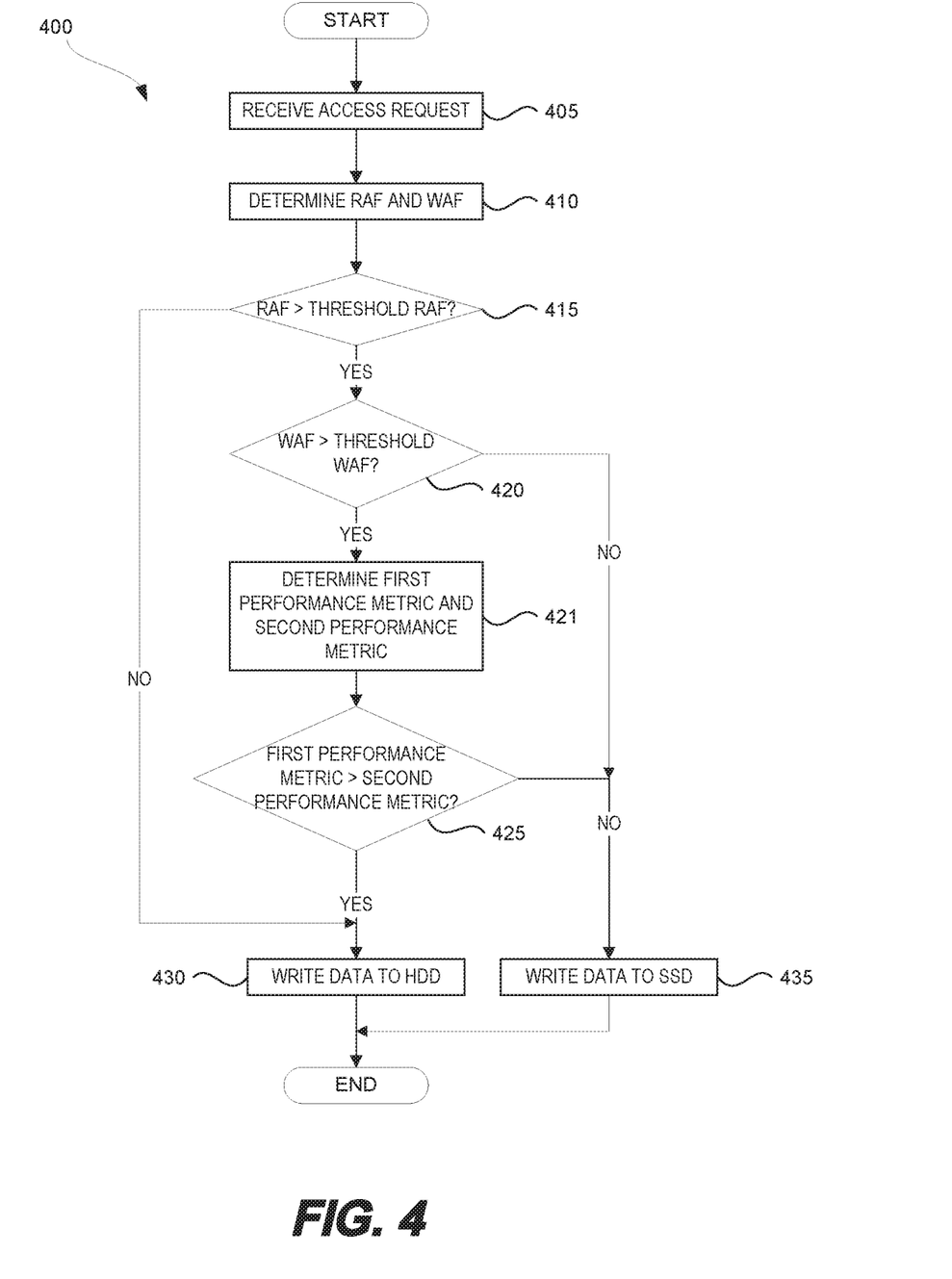
FIG. 4 is a flow diagram illustrating an example process for writing data to a storage array, in accordance with one or more embodiments.

FIG. 4 is a flow diagram illustrating an example process 400 for writing data to a storage array (e.g., for storing data in a storage array or a sub-array of the storage array), in accordance with one or more embodiments. The process 400 may be performed by a storage module, a processing device (e.g., a processor, a central processing unit (CPU)), and/or a computing device (e.g., a server computing device). The storage module, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

At block 405, the process 400 may receive an access request to write data to the storage array. For example, the process 400 may receive an access request from a storage application and/or a client computing device, as discussed above. The process 400 may determine the read access frequency (RAF) and the write access frequency (WAF) of the data (that is to be written to the storage array) at block 410, as discussed above. For example, the process 400 may use various algorithms, functions, formulas, operations, etc., to determine the read access frequency and the write access frequency for the data, as discussed above. In another example, the process 400 may receive the read access frequency and the write access frequency from a user or a configuration file/setting, as discussed above.

At block 415, the process 400 determines whether the read access frequency (of the data) is greater than a threshold read access frequency (e.g., whether the data is read hot data), as discussed above. If the read access frequency is not greater than (e.g., is less than or equal to) the threshold read access frequency, the process 400 proceeds to block 430 where the data is written to (e.g., stored one) one or more hard disk drives in a sub-array. If the read access frequency is greater than the threshold read access frequency, the process 400 proceeds to block 420 where the process 400 determines whether the write access frequency (of the data) is greater than a threshold write access frequency (e.g., whether the data is write hot data). If the write access frequency is not greater than (e.g., is less than or equal to) the threshold write access frequency, the process 400 proceeds to block 435 where the data is written to (e.g., stored one) one or more solid-state drives in a sub-array.

If the write access frequency is greater than the threshold write access frequency (and the read access frequency is greater than the threshold read access frequency), the process 400 proceeds to block 421 where the process 400 determines a first performance metric for the solid-state drives in the sub-array (e.g., a SSD performance metric) and a second performance metric for the hard disk drives in the sub-array (e.g., a HDD performance metric), as discussed above. For example, the process 400 may use equations (2)-(4) to determine (e.g., calculate, generate, obtain, etc.) the first performance metric (for the solid-state drives in the sub-array) and the second performance metric (for the hard disk drives in the sub-array).

At block 425, the process 400 determines whether the first performance metric (e.g., the SSD performance metric) is greater than the second performance metric (e.g., the HDD performance metric). For example, the process 500 may use equation (5) to determine whether the first performance metric is greater than the second performance metric. If the first performance metric is greater than the second performance metric, the process 400 may write (e.g., store) the data to the hard disk drives at block 430, as discussed above. If the first performance metric (e.g., the SSD performance metric) is not greater than (e.g., is less than or equal to) the second performance metric (e.g., the HDD performance metric), the process 400 may write (e.g., store) the data to the solid-states drives at block 435, as discussed above.

Figure 5:
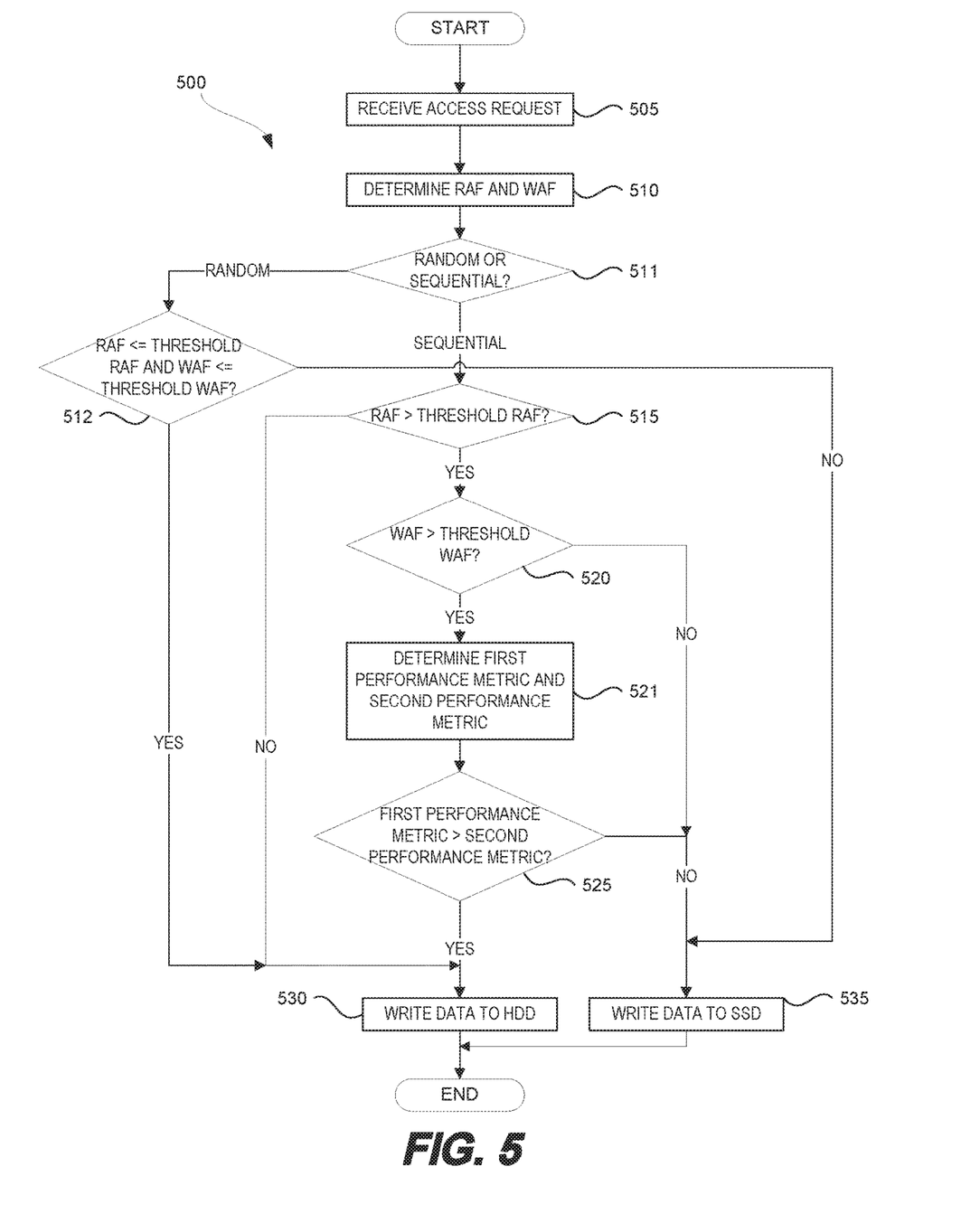
FIG. 5 is a flow diagram illustrating an example process for writing data to a storage array, in accordance with one or more embodiments.

FIG. 5 is a flow diagram illustrating an example process 500 for writing data to a storage array (e.g., for storing data in a storage array or a sub-array of the storage array), in accordance with one or more embodiments. The process 500 may be performed by a storage module, a processing device (e.g., a processor, a central processing unit (CPU)), and/or a computing device (e.g., a server computing device). The storage module, processing device, and/or computing device may be processing logic that includes hardware (e.g., circuitry, dedicated logic, programmable logic, microcode, etc.), software (e.g., instructions run on a processor to perform hardware simulation), firmware, or a combination thereof.

At block 505, the process 500 may receive an access request to write data to the storage array. For example, the process 500 may receive an access request from a storage application and/or a client computing device, as discussed above. The process 500 may determine the read access frequency (RAF) and the write access frequency (WAF) of the data (that is to be written to the storage array) at block 510, as discussed above. For example, the process 500 may use various algorithms, functions, formulas, operations, etc., to determine the read access frequency and the write access frequency for the data, as discussed above. In another example, the process 500 may receive the read access frequency and the write access frequency from a user or a configuration file/setting, as discussed above.

At block 511, the process 500 determines whether the data (received in/with the access request) is random data or sequential data. For example, the process 500 may determine whether the data is distributed/scattered across separate blocks. In another example, the process 500 may determine whether the data is written to sequential blocks (e.g., a set of continuous/contiguous blocks). If the data is random, the process 500 may determine whether the read-access frequency is less than or equal to a threshold read access frequency and whether the write access frequency is less than or equal to a threshold write access frequency (e.g., whether the data is not read hot data and is not write hot data) at block 512. If the read-access frequency is less than or equal to a threshold read access frequency and the write access frequency is less than or equal to a threshold write access frequency, the process 500 may store/write the data to the hard disk drives in the sub-array at block 530. If the read-access frequency is greater than a threshold read access frequency or the write access frequency is greater than a threshold write access frequency, the process 500 may store/write the data to the solid-state drives in the sub-array at block 535.

If the data is sequential data, the process 500 proceeds to block 515. At block 515, the process 500 determines whether the read access frequency (of the data) is greater than a threshold read access frequency (e.g., whether the data is read hot data), as discussed above. If the read access frequency is not greater than (e.g., is less than or equal to) the threshold read access frequency, the process 500 proceeds to block 530 where the data is written to (e.g., stored one) one or more hard disk drives in a sub-array. If the read access frequency is greater than the threshold read access frequency, the process 500 proceeds to block 520 where the process 500 determine whether the write access frequency (of the data) is greater than a threshold write access frequency (e.g., whether the data is write hot data). If the write access frequency is not greater than (e.g., is less than or equal to) the threshold write access frequency, the process 500 proceeds to block 535 where the data is written to (e.g., stored one) one or more solid-state drives in a sub-array.

If the write access frequency is greater than the threshold write access frequency (and the read access frequency is greater than the threshold read access frequency), the process 500 proceeds to block 521 where the process 500 determines a first performance metric for the solid-state drives in the sub-array (e.g., a SSD performance metric) and a second performance metric for the hard disk drives in the sub-array (e.g., a HDD performance metric), as discussed above. For example, the process 500 may use equations (2)-(5) to determine (e.g., calculate, generate, obtain, etc.) the first performance metric (for the solid-state drives in the sub-array) and the second performance metric (for the hard disk drives in the sub-array At block 525, the process 500 determines whether the first performance metric (e.g., the SSD performance metric) is greater than the second performance metric (e.g., the HDD performance metric). For example, the process 500 may use equation (5) to determine whether the first performance metric is greater than the second performance metric. If the first performance metric is greater than the second performance metric, the process 500 may write (e.g., store) the data to the hard disk drives at block 530, as discussed above. If the first performance metric (e.g., the SSD performance metric) is not greater than (e.g., is less than or equal to) the second performance metric (e.g., the HDD performance metric), the process 500 may write (e.g., store) the data to the solid-states drives at block 535, as discussed above.

Figure 6:
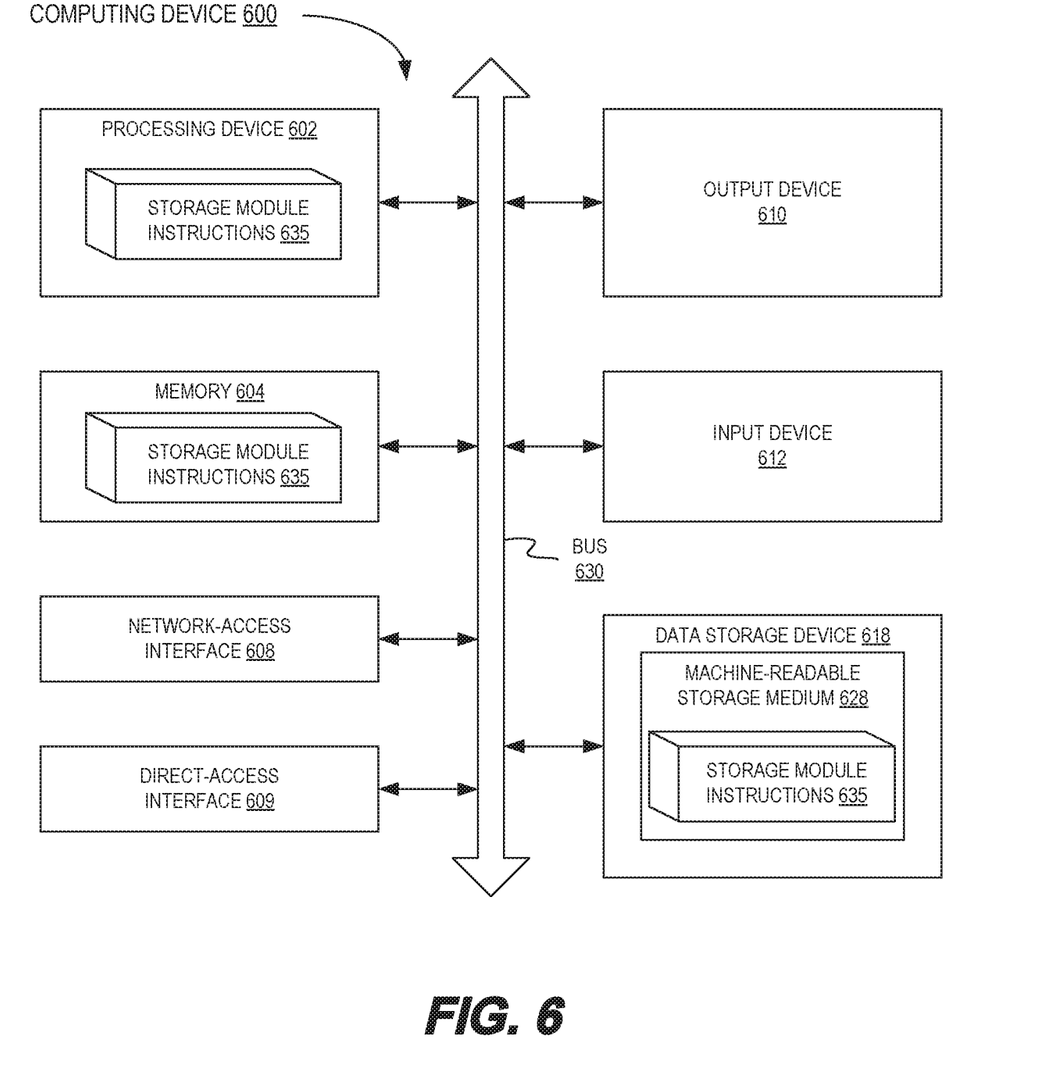
FIG. 6 is a diagram of a computing device, in accordance with one or more embodiments.

FIG. 6 is a diagram of a computing device 600, in accordance with one or more embodiments. The computing device 600 may execute instructions that may cause the computing device 600 to perform any one or more of the methodologies (e.g., operations, methods, functions, etc.) discussed herein, may be executed. The computing device 600 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the functions, operations, methods, algorithms, etc., discussed herein.

The example computing device 600 includes a processing device (e.g., a processor, a controller, a central processing unit (CPU), etc.) 602, a main memory 604 (e.g., read-only memory (ROM), flash memory, dynamic random access memory (DRAM) such as synchronous DRAM (SDRAM)), a network-access interface 608, a direct-access interface 609, an output device, 610, an input device 612, and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute storage module instructions 635 (e.g., instructions for the storage module 211 illustrated in FIG. 2) for performing the operations and steps discussed herein.

The computing device 600 may include a network-access interface 608 (e.g., a network interface card, a Wi-Fi interface, etc.) which may communicate with a network (e.g., network 170 illustrated in FIG. 1). The computing device may also include a direct-access interface 609 (e.g., a USB interface, an eSATA interface, a Thunderbolt interface, etc.). The computing device 600 also may include an output device 610 (e.g., a liquid crystal display (LCD) or a cathode ray tube (CRT)), and an input device 612 (e.g., a mouse, a keyboard, etc.). In one embodiment, the output device 610 and the input device 612 may be combined into a single component or device (e.g., an LCD touch screen).

The data storage device 618 may include a computer-readable storage medium 628 on which is stored one or more sets of instructions (e.g., storage module instructions 635) embodying any one or more of the methodologies or functions described herein. The storage module instructions 635 may also reside, completely or at least partially, within the main memory 604 and/or within the processing device 602 during execution thereof by the computing device 600. The main memory 604 and the processing device 602 may also constitute computer-readable media. The instructions may further be transmitted or received over via the network-access interface 608 and/or direct-access interface 609.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

General Comments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

Methods and processes described herein may be embodied in, and partially or fully automated via, software code modules executed by one or more general and/or special purpose computers/processors. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). The software instructions may be stored on any type of computer-readable medium (e.g., a non-transitory computer-readable medium) or other computer storage device or collection of storage devices. "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. An apparatus comprising:
   a storage array comprising:
      a first set of solid-state drives, wherein each solid-state drive of the first set of solid-state drives has a first data throughput; and
      a first set of striped hard disk drives, wherein a total number of the hard disk drives in the first set of striped hard disk drives is selected such that a second data throughput of the first set of striped hard disk drives is within a threshold throughput of the first data throughput; and
   a processing device configured to:
      receive an access request to write first data to the storage array;
      determine a read access frequency of the first data;
      determine a write access frequency of the first data;
      in response to determining that the read access frequency does not exceed a threshold read access frequency, write the first data to the first set of striped hard disk drives;
      in response to determining that the read access frequency exceeds the threshold read access frequency and that the write access frequency does not exceed a threshold write access frequency, write the first data to the first set of solid-state drives; and
      in response to determining that the read access frequency exceeds the threshold read access frequency and that the write access frequency exceeds the threshold write access frequency, select whether to write the first data to the first set of solid-state drives or the first set of striped hard disk drives based on a first performance metric for the first set of solid-state drives and a second performance metric for the first set of striped hard disk drives.

2. The apparatus of claim 1, wherein the processing device is further configured to:
   determine the first performance metric for the first set of solid-state drives and the second performance metric for the first set of striped hard disk drives.

3. The apparatus of claim 1, wherein the processing device is further configured to select whether to write the first data to the first set of solid-state drives or the first set of striped hard disk drives by:
   selecting to write the first data to the first set of striped hard disk drives in response to determining that the first performance metric is not less than the second performance metric.

4. The apparatus of claim 1, wherein:
   the first performance metric is based on a first random access performance and a first sequential access performance of the first set of solid-state drives; and
   the second performance metric is based on a second random access performance and a second sequential access performance of the first set of striped hard disk drives.

5. The apparatus of claim 1, wherein the processing device is further configured to:
   determine the total number of the hard disk drives in the first set of striped hard disk drives based on the first data throughput.

6. The apparatus of claim 1, wherein the first set of striped hard disk drives are configured in a redundant array of independent disks (RAID) configuration.

7. A method, comprising:
receiving an access request to write first data to a storage array, wherein the storage array comprises:
a first set of solid-state drives, wherein each solid-state drive of the first set of solid-state drives has a first data throughput; and
a first set of striped hard disk drives, wherein a total number of the hard disk drives in the first set of striped hard disk drives is selected such that a second data throughput of the first set of striped hard disk drives is within a threshold throughput of the first data throughput; and
determining a read access frequency of the first data;
determining a write access frequency of the first data;
in response to determining that the read access frequency does not exceed a threshold read access frequency, writing the first data to the first set of striped hard disk drives;
in response to determining that the read access frequency exceeds the threshold read access frequency and that the write access frequency does not exceed a threshold write access frequency, writing the first data to the first set of solid-state drives; and
in response to determining that the read access frequency exceeds the threshold read access frequency and that the write access frequency exceeds the threshold write access frequency, selecting whether to write the first data to the first set of solid-state drives or the first set of striped hard disk drives, based on a first performance metric for the first set of solid-state drives and a second performance metric for the first set of striped hard disk drives.

8. The method of claim 7, further comprising:
determining the first performance metric for the first set of solid-state drives and the second performance metric for the first set of striped hard disk drives.

9. The method of claim 7, wherein selecting whether to write the first data to the first set of solid-state drives or the first set of striped hard disk drives comprises:
selecting to write the first data to the first set of striped hard disk drives in response to determining that the first performance metric is not less than the second performance metric.

10. The method of claim 7, wherein selecting whether to write the first data to the first set of solid-state drives or the first set of striped hard disk drives comprises:
selecting to write the first data to the first set of solid-state drives in response to determining that the first performance metric is less than the second performance metric.

11. The method of claim 7, wherein:
the first performance metric is based on a first random access performance and a first sequential access performance of the first set of solid-state drives; and
the second performance metric is based on a second random access performance and a second sequential access performance of the first set of striped hard disk drives.

12. The method of claim 7, further comprising:
determining the total number of the hard disk drives in the first set of striped hard disk drives based on the first data throughput.

13. An apparatus, comprising:
means for receiving an access request to write first data to a storage array, wherein the storage array comprises:
a first set of solid-state drives, wherein each solid-state drive of the first set of solid-state drives has a first data throughput; and
a first set of striped hard disk drives, wherein a second data throughput of the first set of striped hard disk drives is within a threshold throughput of the first data throughput;
means for determining a read access frequency of the first data;
means for determining a write access frequency of the first data; and
means for writing the first data to the first set of striped hard disk drives in response to determining that the read access frequency does not exceed a threshold read access frequency;
means for writing the first data to the first set of solid-state drives in response to determining that the read access frequency exceeds the threshold read access frequency and that the write access frequency does not exceed a threshold write access frequency; and
means for selecting whether to write the first data to the first set of solid-state drives or the first set of striped hard disk drives, based on a first performance metric for the first set of solid-state drives and a second performance metric for the first set of striped hard disk drives in response to determining that the read access frequency exceeds the threshold read access frequency and that the write access frequency exceeds the threshold write access frequency.

14. The apparatus of claim 13, further comprising:
means for determining the first performance metric for the first set of solid-state drives and the second performance metric for the first set of striped hard disk drives;
means for selecting to write the first data to the first set of solid-state drives in response to determining that the first performance metric is less than the second performance metric; and
means for selecting to write the first data to the first set of striped hard disk drives in response to determining that the first performance metric is not less than the second performance metric.

15. The apparatus of claim 13, wherein:
the first performance metric is based on a first random access performance and a first sequential access performance of the first set of solid-state drives; and
the second performance metric is based on a second random access performance and a second sequential access performance of the first set of striped hard disk drives.

16. The apparatus of claim 13, further comprising:
means for determining a total number of the hard disk drives in the first set of striped hard disk drives based on the first data throughput.

17. The apparatus of claim 13, wherein the first set of striped hard disk drives are configured in a redundant array of independent disks (RAID) configuration.

* * * * *